United States Patent
Sathaye

(10) Patent No.: US 7,395,416 B1
(45) Date of Patent: Jul. 1, 2008

(54) COMPUTER PROCESSING SYSTEM EMPLOYING AN INSTRUCTION REORDER BUFFER

(75) Inventor: Sumedh W. Sathaye, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 114 days.

(21) Appl. No.: 11/531,042

(22) Filed: Sep. 12, 2006

(51) Int. Cl.
*G06F 9/30* (2006.01)
(52) U.S. Cl. .......................... 712/218; 712/43; 712/229
(58) Field of Classification Search ................... 712/43, 712/218, 229
See application file for complete search history.

(56) References Cited

U.S. PATENT DOCUMENTS

| | | | |
|---|---|---|---|
| 6,112,019 A * | 8/2000 | Chamdani et al. | 712/214 |
| 6,311,261 B1 * | 10/2001 | Chamdani et al. | 712/23 |
| 7,155,600 B2 * | 12/2006 | Burky et al. | 712/229 |
| 2005/0050303 A1 * | 3/2005 | Rosner et al. | 712/218 |
| 2005/0071613 A1 * | 3/2005 | DeSylva et al. | 712/227 |

OTHER PUBLICATIONS

Definition of "host system" from Wikipedia.org, accessed Mar. 16, 2008.*
Definition of "computer" from Wikipedia.org, accessed Mar. 16, 2008.*
Gurindar S. Sohi, Instruction Issue Logic for High-Performance, Interruptible, Multiple Functional Unit, Pipelined Computers, IEEE Transactions on Computers, vol. 39, Mar. 1990, pp. 349-359.
Leenstra et al., A 1.8-GHz Instruction Window Buffer for an Out-of Order Microprocessor Core, IEEE Journal of Solid-State Circuits, Vo. 36, No. 11, Nov. 2001, pp. 1628-1635.

* cited by examiner

*Primary Examiner*—Richard Ellis
(74) *Attorney, Agent, or Firm*—Cantor Colburn LLP; Alison D. Mortinger

(57) ABSTRACT

A method and a system for operating a plurality of processors that each includes an execution pipeline for processing dependence chains, the method comprising: configuring the plurality of processors to execute the dependence chains on execution pipelines; implementing a Super Re-Order Buffer (SuperROB) in which received instructions are re-ordered after out-of-order execution when at least one of the plurality of processors is in an Instruction Level Parallelism (ILP) mode and at least one of the plurality of processors has a Thread Level Parallelism (TLP) core; detecting an imbalance in a dispatch of instructions of a first dependence chain compared to a dispatch of instructions of a second dependence chain with respect to dependence chain priority; determining a source of the imbalance; and activating the ILP mode when the source of the imbalance has been determined.

18 Claims, 12 Drawing Sheets

COMPUTER PROCESSING SYSTEM EMPLOYING AN INSTRUCTION REORDER BUFFER

GOVERNMENT INTEREST

This invention was made with Government support under contract No.: NBCH3039004 awarded by Defense Advanced Research Projects Agency (DARPA). The government has certain rights in this invention.

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates to employing an instruction reorder buffer, and particularly to a technique that takes at least two processors that are optimized to execute dependence chains, and co-locate the processors with a superstructure called SuperROB (Super Re-Order Buffer).

2. Description of Background

Many processors designed today are optimized for execution of tight dependence chains. A dependence chain is a sequence of instructions in a program in which a temporally sequential instruction is data-dependent on a temporally previous instruction. Examples of key data dependence paths that processors optimize are: load-compare-branch, load-load, load-compute, and compute-compute latencies. Examples of such processors are: the PPE (Power Processing Element) core on the Sony-Toshiba-IBM Broadband Engine, the IBM Power3 core, Itanium cores from Intel®, and almost all of the modern cores implementing z/Architecture technologies.

Current research in processor technology and computer architecture is motivated primarily by the desire for greater performance. Greater performance may be achieved by increasing parallelism in execution. There are two kinds of parallelism in typical program workloads. These are Instruction Level Parallelism (ILP) and Thread Level Parallelism (TLP). Some modern computer processors are specifically designed to capture ILP in programs (for example, IBM Power4 & 5, Intel Pentium), while multiprocessor systems are designed to capture TLP across threads or processes. Processor cores that are optimized to execute dependence chains are often also expected to execute ILP workloads. ILP workloads have more than one concurrent dependence chain, and overlapped execution of the chains is typically possible, provided the ILP between the chains has been exposed and exploited by the machine.

The evolution of microprocessor design has led to processors with higher clock frequencies to improve single-tread performance. These processors exploit ILP to speed up single-threaded applications. ILP attempts to increase performance by determining, at run time, instructions that can be executed in parallel. The trade-off is that ILP extraction requires highly complex microprocessors that consume a significant amount of power.

Thus, it is well known that different processor technologies utilize the ILP and TLP workloads differently to achieve greater processor performance. However, in existing ILP and TLP system architectures it is difficult to optimize the processor for both high-throughput TLP-oriented and ILP-oriented applications. It is very cumbersome to map ILP applications on one or more TLP cores. Thus, alternative processor architectures are necessary for providing ILP extraction on demand, for allowing global communication, for allowing efficient ILP exposition, extraction, and exploitation, and for efficiently operating across a plurality of TLP cores.

SUMMARY OF THE INVENTION

The shortcomings of the prior art are overcome and additional advantages are provided through the provision of a method for operating a plurality of processors that each includes an execution pipeline for processing dependence chains, the method comprising: configuring the plurality of processors to execute the dependence chains on execution pipelines; implementing a Super Re-Order Buffer (Super-ROB) in which received instructions are re-ordered for out-of-order execution when at least one of the plurality of processors is in an Instruction Level Parallelism (ILP) mode and at least one of the plurality of processors has a Thread Level Parallelism (TLP) core; detecting an imbalance in a dispatch of instructions of a first dependence chain compared to a dispatch of instructions of a second dependence chain with respect to dependence chain priority; determining a source of the imbalance; and activating the ILP mode when the source of the imbalance has been determined.

The shortcomings of the prior art are overcome and additional advantages are provided through the provision of a system for operating a plurality of processors that each includes an execution pipeline for processing dependence chains, the system comprising: a network; and a host system in communication with the network, the host system including software to implement a method comprising: configuring the plurality of processors to execute the dependence chains on execution pipelines; implementing a Super Re-Order Buffer (SuperROB) in which received instructions are re-ordered for out-of-order execution when at least one of the plurality of processors is in an Instruction Level Parallelism (ILP) mode and at least one of the plurality of processors has a Thread Level Parallelism (TLP) core; detecting an imbalance in a dispatch of instructions of a first dependence chain compared to a dispatch of instructions of a second dependence chain with respect to dependence chain priority; determining a source of the imbalance; and activating the ILP mode when the source of the imbalance has been determined.

Additional features and advantages are realized through the techniques of the present invention. Other embodiments and aspects of the invention are described in detail herein and are considered a part of the claimed invention. For a better understanding of the invention with advantages and features, refer to the description and the drawings.

TECHNICAL EFFECTS

As a result of the summarized invention, technically we have achieved a solution that takes at least two processors that are optimized to execute dependence chains, and co-locate the processors with a superstructure called SuperROB (Super Re-Order Buffer).

BRIEF DESCRIPTION OF THE DRAWINGS

The subject matter, which is regarded as the invention, is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION OF THE INVENTION

One aspect of the exemplary embodiments is a superstructure called SuperROB (Super Re-Order Buffer) that operates across a plurality of TLP cores. Another aspect of the exemplary embodiments is a method of mapping ILP applications on a TLP core by providing for ILP extraction on demand.

Figure 1:
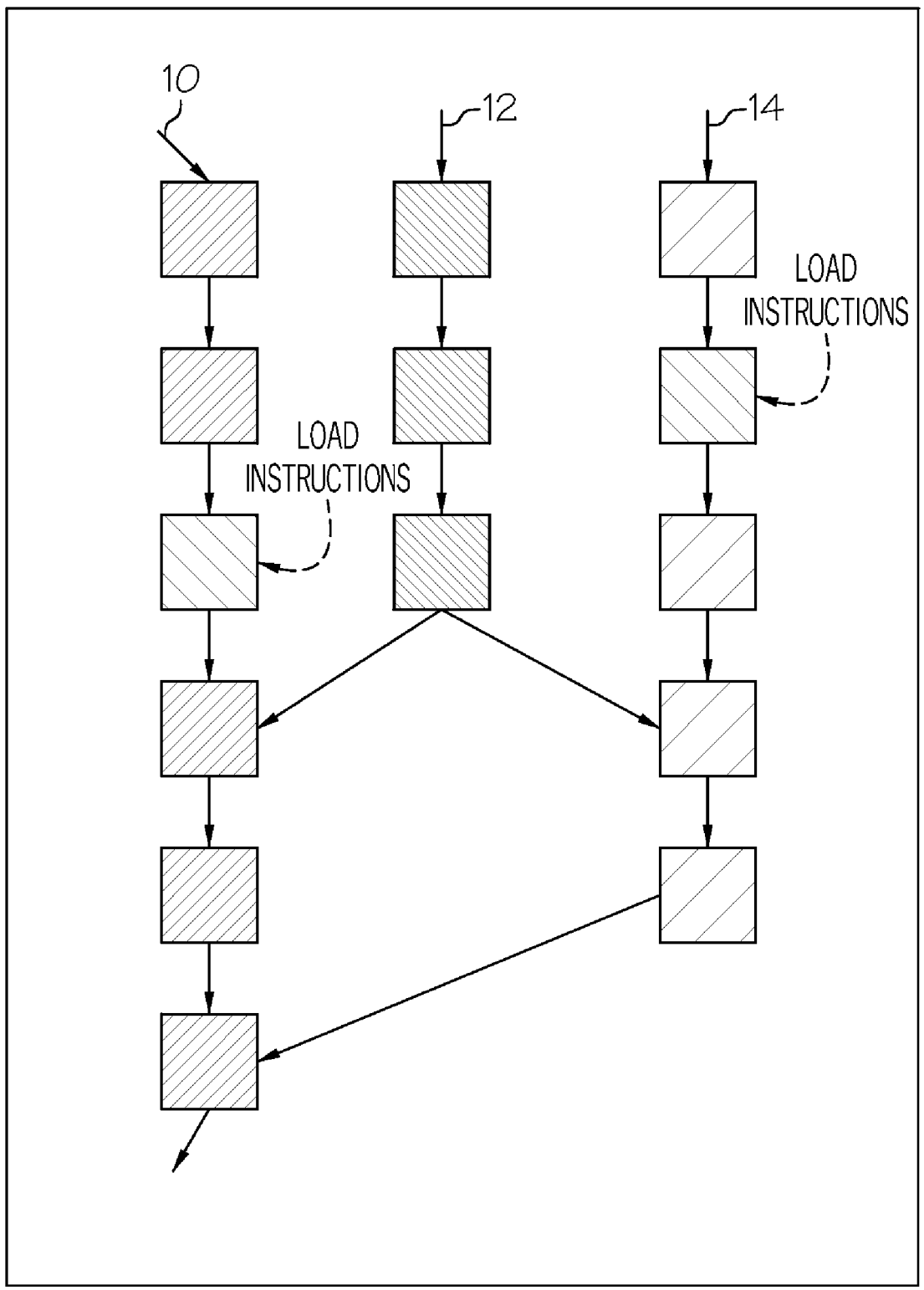
FIG. 1 illustrates one example of an Instruction Level Parallelism (ILP) workload.

For a long time, the secret to more performance was to execute more instructions per cycle, otherwise known as ILP, or decreasing the effective latency of instructions. To execute more instructions each cycle, more functional units (e.g., integer, floating point, load/store units, etc.) had to be added. In order to more consistently execute multiple instructions, a processing paradigm called out-of-order processing (OOP) may be used. FIG. 1 illustrates one example of an ILP workload using such processing paradigm.

In FIG. 1, there are three semi-independent chains of dependences that contain load instructions. Key data dependence paths that the processor optimizes are compute-compute latencies. Furthermore, high-accuracy branch prediction is usually a necessary condition to improve the performance of high-ILP workloads. In order to achieve high execution performance in a program area having high instruction-level parallelism, the processor contains large computational resources. On the contrary, in a program area having low instruction-level parallelism, even a processor containing small computational resources can achieve sufficient performance.

Furthermore, concerning FIG. 1, the ILP program contains multiple chains of instructions such that the instructions in each chain are clearly data dependent upon each other, but the chains themselves are mostly data-independent of each other. As shown, there are three data-dependence chains in the program, and the first 10 and the third 14 chains of dependences are dependent on the last operation in the middle 12 chain. Chain 10, in turn, dependent on the chain on the last operation in the rightmost chain, chain 14. Across the three chains 10, 12, 14, there is opportunity to overlap the execution of computation instructions with that of other computation instructions, and execution of long-latency memory accesses with other that of computations. It is usually necessary to provide highly accurate branch prediction hardware so as to be able to continue the supply of non-speculative instructions to the main pipeline. This nature of ILP programs can be exploited by processor hardware, which allows multiple-issue of data-independent instructions. Examples of processor hardware that falls in this category are: IBM Power4 and Power5 processors, AMD Opteron processor, and Intel Pentium4 processor.

Figure 2:
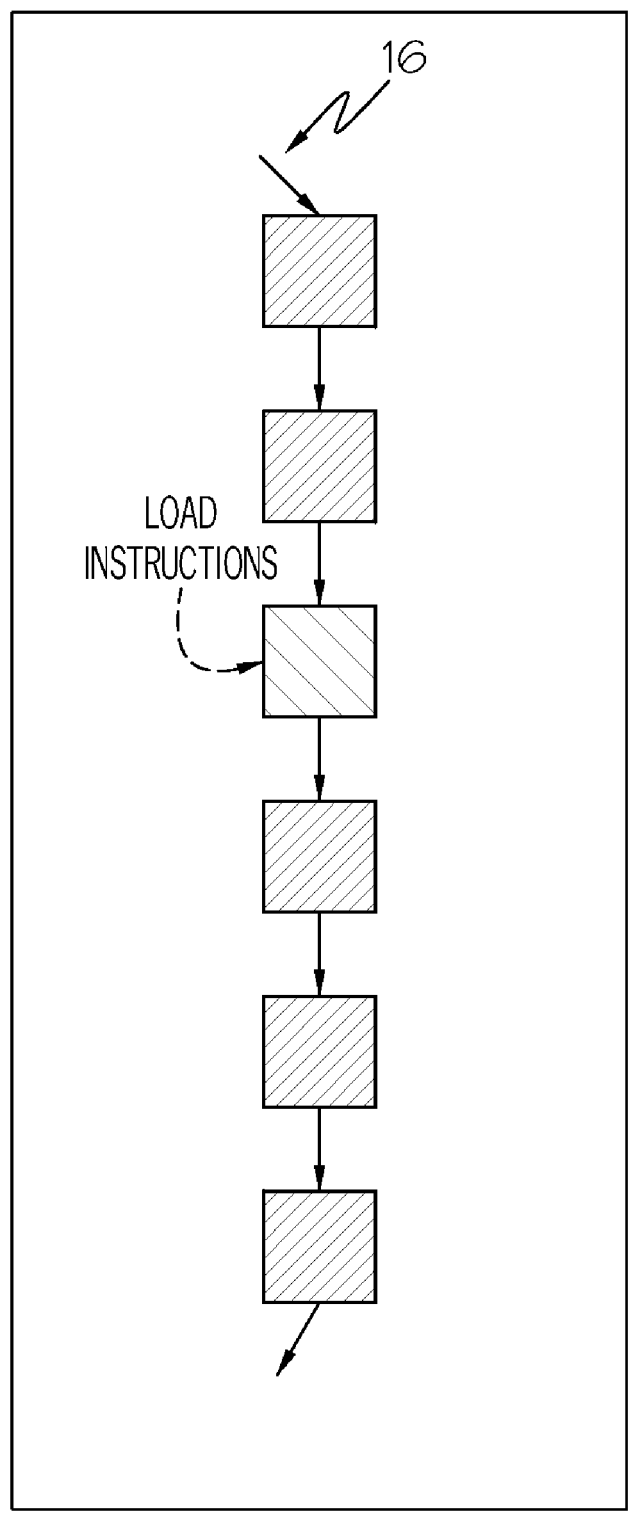
FIG. 2 illustrates one example of a Thread Level Parallelism (TLP) workload.

FIG. 2 illustrates one example of a TLP workload. In FIG. 2, there is one semi-independent chain of dependence that contains load instructions. The key data dependence path that the processor optimizes is a compute-compute latency. TLP is the parallelism inherent in an application that runs multiple threads at once. This type of parallelism is found largely in applications written for commercial servers, such as databases. By running many threads at once, these applications are able to tolerate the high amounts of I/O and memory system latency their workloads can incur. As a result, while one thread is delayed waiting for a memory or disk access, other threads can do useful work in order to keep the processor running efficiently.

Furthermore, concerning FIG. 2, the program in the center of the figure is a pure data-dependence chain 16. Each instruction in the program is data-dependent on the immediately previous instruction. Thus, the execution of an instruction cannot begin until the result datum or the outcome of the previous instruction is available. The hardware complexity of processor hardware with multiple, independent instruction issue hardware capability proves to be unnecessary burden when executing a data-dependence chain program. In addition, thread-level parallelism in a multiprocessor architecture considerably depends on how efficient parallel algorithms are, as well as how efficient a multiprocessor architecture itself is. Scalability of the parallel algorithms is a significant characteristic since running large algorithms in the multiprocessor architecture is essential.

Figure 3:
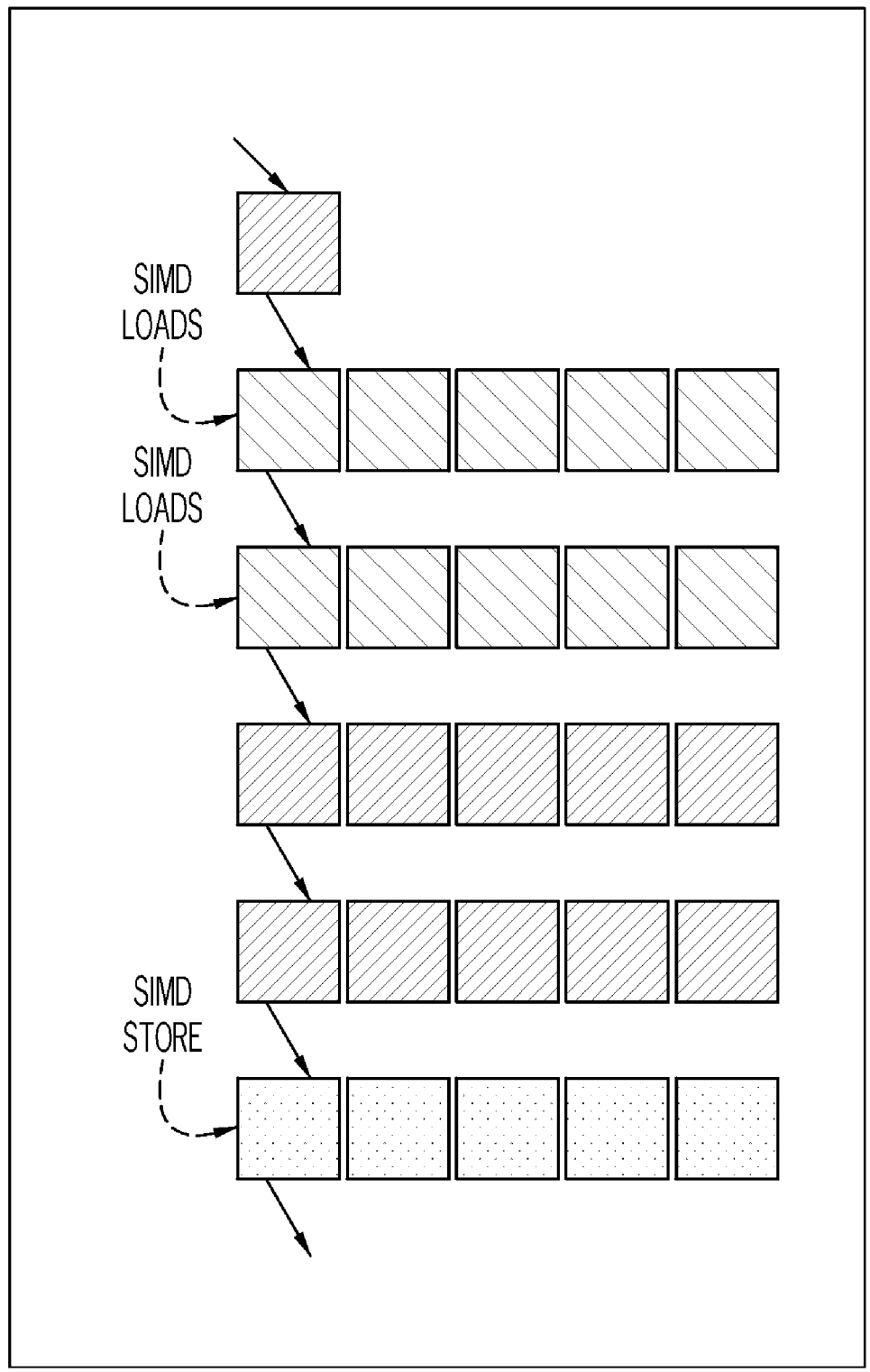
FIG. 3 illustrates one example of a Single Instruction, Multiple Data (SIMD) vector workload.

FIG. 3 illustrates a SIMD workload. In computing, SIMD (Single Instruction, Multiple Data) is a set of operations for efficiently handling large quantities of data in parallel, as in a vector processor or array processor. First popularized in large-scale supercomputers (as opposed to MIMD parallelization), smaller-scale SIMD operations have now become widespread in personal computer hardware. Today the term is associated almost entirely with these smaller units. An advantage is that SIMD systems typically include only those instructions that can be applied to all of the data in one operation. In other words, if the SIMD system works by loading up eight data points at once, the "add" operation being applied to the data occurs to all eight values at the same time. Although the same is true for any superscalar processor design, the level of parallelism in a SIMD system is typically much higher.

SIMD architectures are essential in the parallel world of computers. The ability of the SIMD to manipulate large vectors and matrices in minimal time has created a phenomenal demand of these architectures. The power behind this type of architecture can be realized when the number of processor elements is equivalent to the size of the vector. In this situation, component-wise addition and multiplication of vector elements can be done simultaneously. Even when the size of the vector is larger than the number of processor elements available, the speedup is immense. There are two types of SIMD architectures. The first is the True SIMD and the second is the Pipelined SIMD.

Furthermore, concerning FIG. 3, the program is a data-parallel program, and is shown in the rightmost program representation. The instructions in a data-parallel program operate on data structures that are vectors, rather than scalars. Data-parallel programs can be either of the ILP nature, or may be a data-dependence chain.

The exemplary embodiments of the present invention provide a mechanism to "morph" a computer processor complex, each element of which is designed and optimized to perform work of one kind, into a complex, which can, with relatively high efficiency, perform another kind of work. In doing so, the processor complex transforms itself, on demand, into a single processing structure. Each pair of cores on the TLP chip is connected with each other using a SuperROB (super- instruction re-order buffer). The concept of SuperROB is an extension of the re-order buffer (ROB) used in modern ILP processors.

Figure 4:
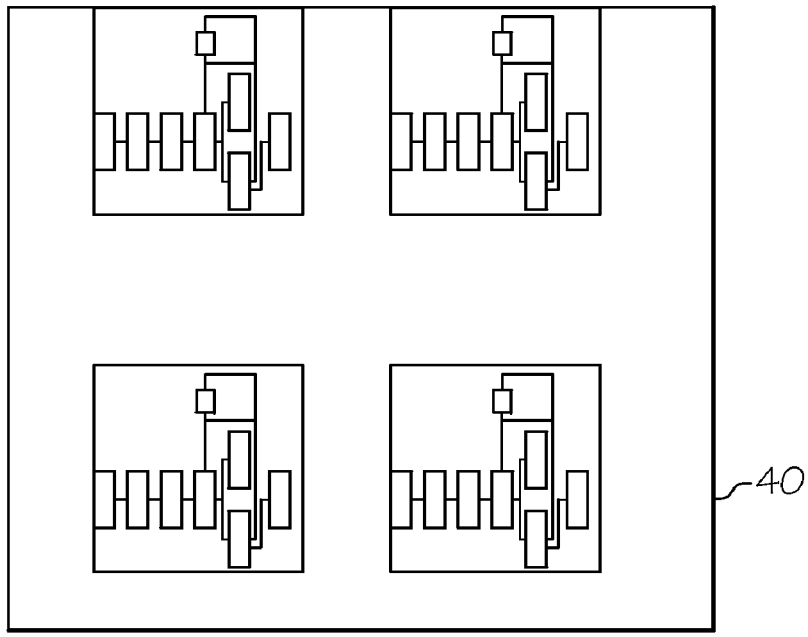
FIG. 4 illustrates one example of a TLP chip and a TLP & ILP Chip including a SuperROB.
Figure 4:
Figure 4:
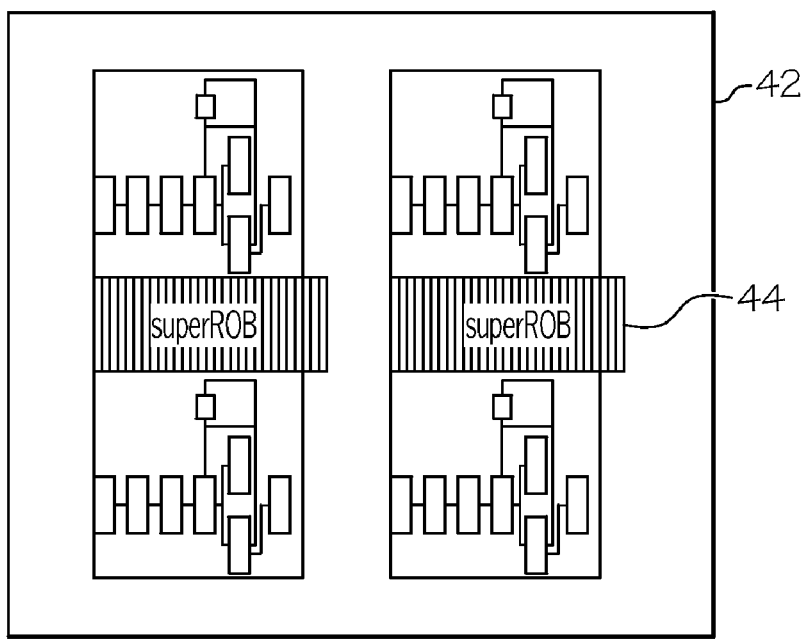

The SuperROB is shown as a queue 44 in FIG. 4. The top portion of FIG. 4 is a TLP chip 40 and the bottom portion of FIG. 4 is a TLP & ILP chip 42 configuration. The basic idea is that when presented with an ILP program, the two cores transform themselves into behaving as one. Therefore, instructions are supplied to the two cores by means of the SuperROB and the state of each instruction is captured in a single entry in the SuperROB. Also, the architected state of the program is captured in the register file of one of the two cores. The SuperROB thus is a mechanism of global communication of program values, and a mechanism to expose, explore, and exploit the instruction-level parallelism inherent in an ILP program. The plurality of cores supplied for the purposes of TLP are combined in an innovative fashion to also target ILP programs.

Figure 5:
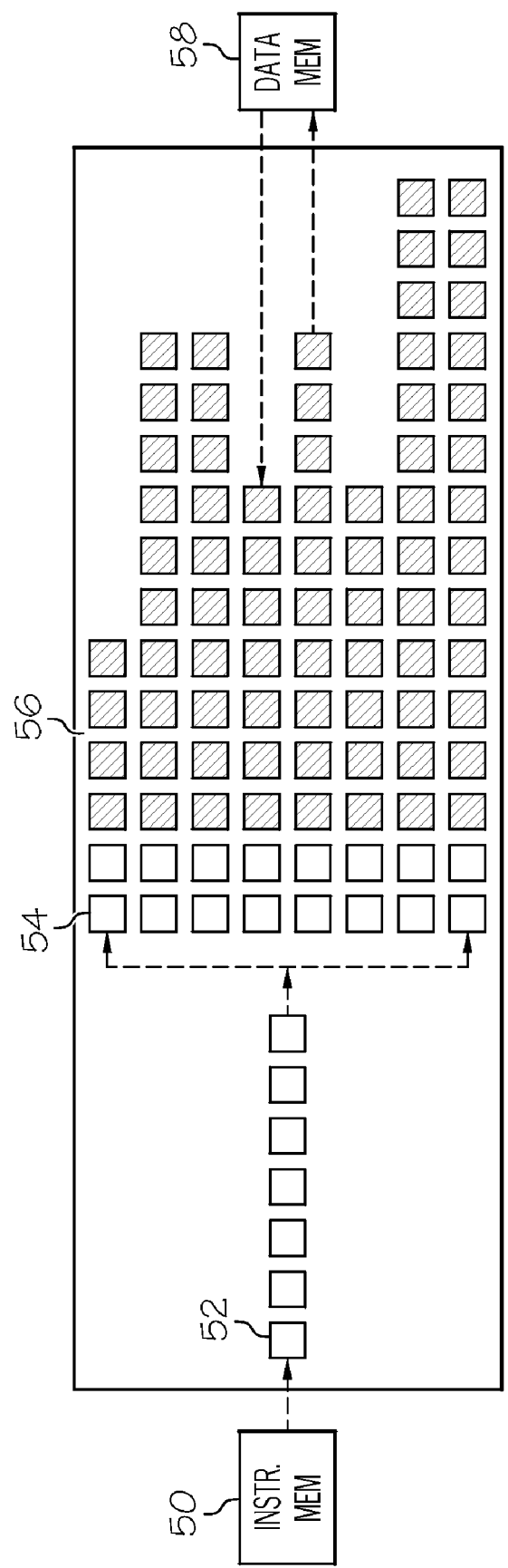
FIG. 5 illustrates one example of an in-order core for the TLP workload.

FIG. 5 illustrates an in-order core for TLP workloads. FIG. 5 depicts an instruction memory 50, instruction data 52, stored data 54, "data memory" data 56, and a data memory 58. In FIG. 5, there are several semi-independent chains of dependences that contain load instructions. Key data dependence paths that the processor optimizes are compute-compute, load-to-use, and compare-to-branch latencies. Furthermore, the in-order processor comprises multiple execution pipelines, there is no register renaming in the processor pipeline, and no mechanism to enforce orderly completion of instructions to maintain sanctity of architectural state. Thus, the instructions are not issued out of order.

The out-of-order instruction processing in OOP necessitates a mechanism to store the instructions in the original program order. If a temporally later instruction causes an exception before a temporally earlier instruction, then the exception must be withheld from recognition until the temporally earlier instruction has completed execution and updated the architected state as appropriate. To help alleviate this problem, a larger number of instructions are stored in program order in a buffer called the re-order buffer to allow precise exception handling. While precise exception handling is the primary motivation behind having a reorder buffer, it has also been used to find more instructions that are not dependent upon each other. The size of reorder buffers has been growing in most modern commercial computer architectures with some processors able to store as many as 126 instructions in-flight. The reason for increasing the size of the reorder buffer is that spatially related code also tends to be temporally related in terms of execution (with the possible exclusion of arrays of complex structures and linked lists). These instructions also have a tendency to depend upon the outcome of prior instructions. With a CPU's ever increasing amount of required code, the only current way to find and accommodate the execution of more independent instructions has been to increase the size of the reorder buffer. However, using this technique has achieved a rather impressive downturn in the rate of increased performance and in fact has been showing diminishing returns. It is now taking more and more transistors to achieve the same rate of performance increase. Instead of focusing intently upon uniprocessor ILP extraction, it is desired to focus on super re-order buffers that may co-locate a plurality of buffers within a superstructure.

Figure 6:
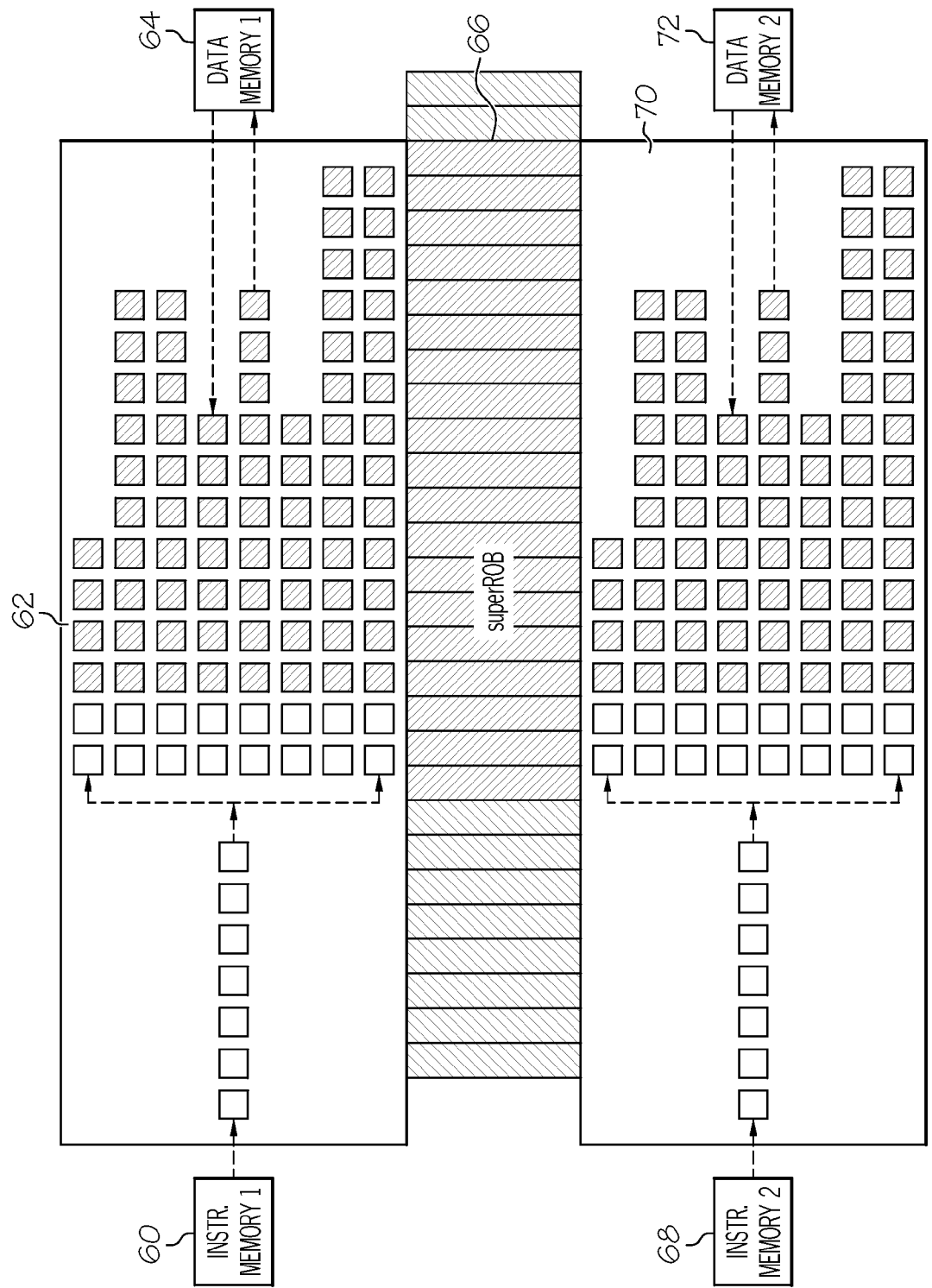
FIG. 6 illustrates one example of a Super Re-Order Buffer (SuperROB)

FIG. 6 illustrates one example of a Super Re-Order Buffer (SuperROB). FIG. 6 depicts a first instruction memory 60, a first TLP core 62, a first data memory 64, a SuperROB 66, a second instruction memory 68, a second TLP core 70, and a second data memory 72. The SuperROB architecture provides for ILP extraction on demand, it operates across a plurality of TLP cores, it allows for global communication, and it allows for efficient ILP exposition, extraction, and exploitation. FIG. 6 shows two TLP cores that are separated by a buffer (SuperROB). The SuperROB acts as the communication mechanism between the two TLP cores. When the processor is in TLP mode, then the SuperROB is turned off. When the processor is in ILP mode, then the SuperROB is turned on.

All contemporary dynamically scheduled processors support register renaming to cope with false data dependences. One of the ways to implement register renaming is to use the slots within the Reorder Buffer (ROB) as physical registers. In such designs, the ROB is a large multi-ported structure that occupies a significant portion of the die area and dissipates a sizable fraction of the total chip power. The heavily ported ROB is also likely to have a large delay that can limit the processor clock rate. However, by utilizing a SuperROB these delays may be minimized.

The method of using a reorder buffer for committing (retiring) instructions in sequence in an out of order processor has been fundamental to out of order processor design. In the case of a complex instruction set computer (CISC) architecture complex instructions are cracked (mapped) into sequences of primitive instructions. Nullification in case of an exception is a problem for these instructions, because the exception may occur late in the sequence of primitive instructions.

Figure 7:
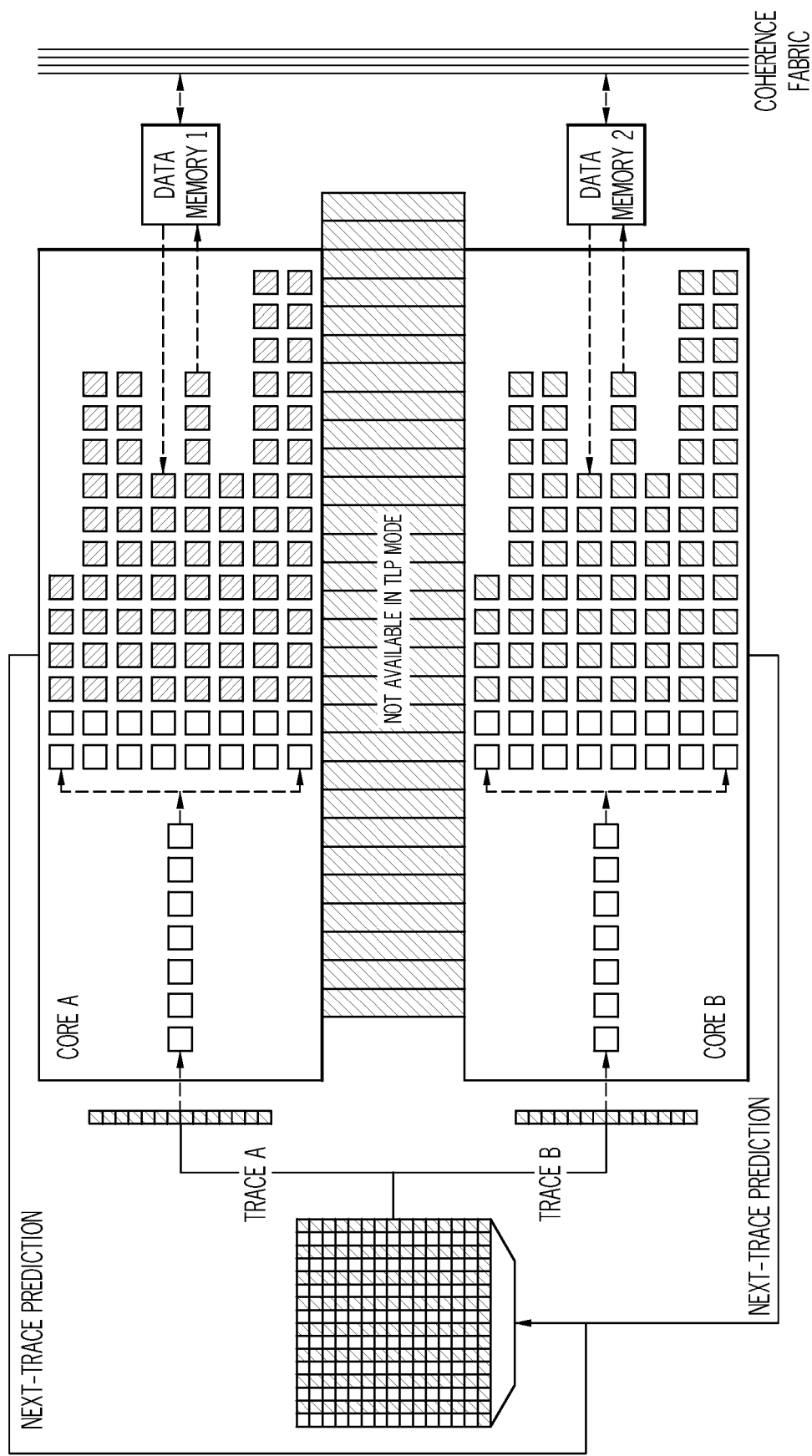
FIG. 7 illustrates one example of a SuperROB operated in the TLP workload mode.
Figure 8:
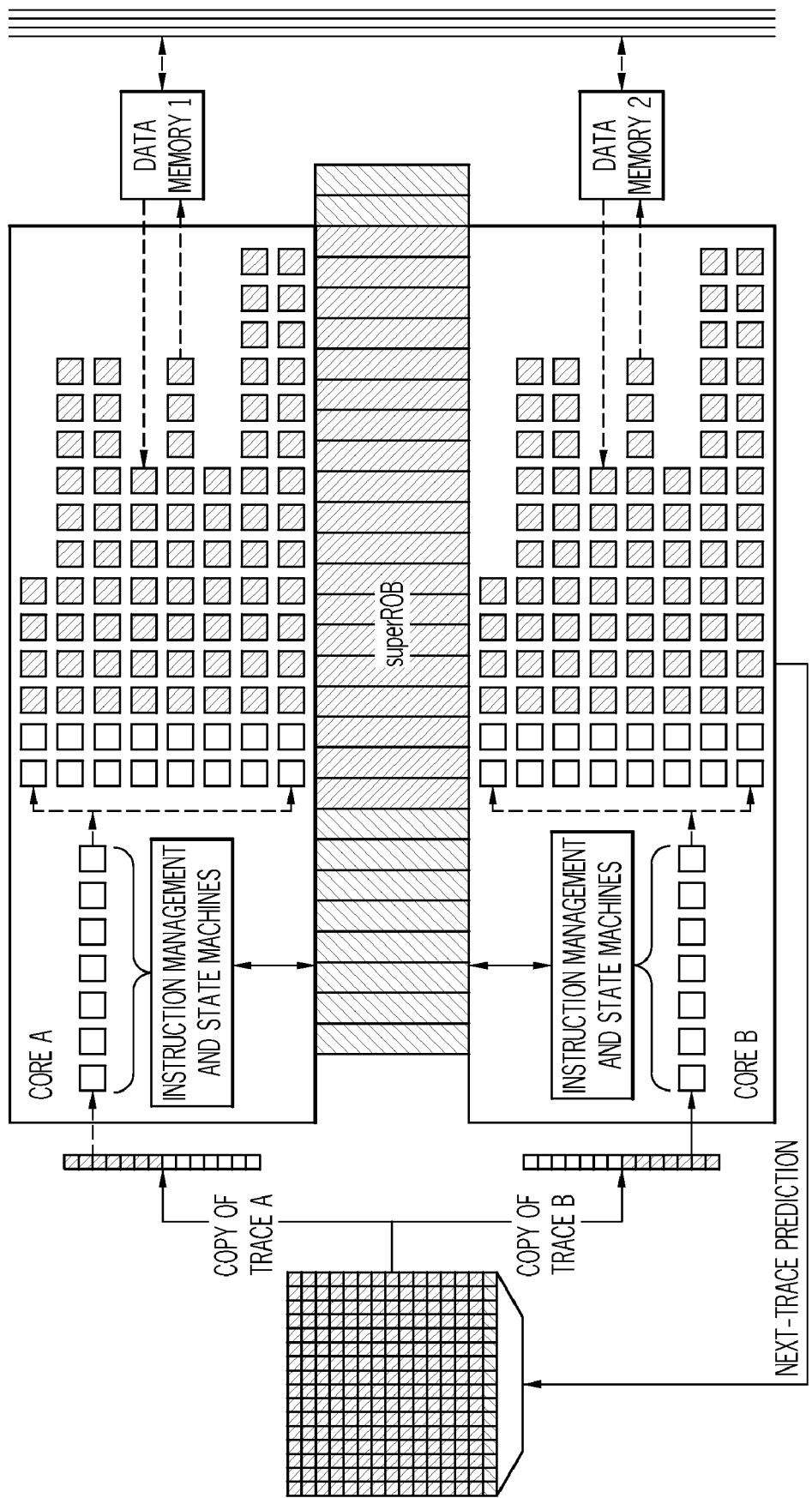
FIG. 8 illustrates one example of a SuperROB operated in the ILP workload mode.

FIG. 7 illustrates one example of a SuperROB operated in the TLP workload mode and FIG. 8 illustrates one example of a SuperROB operated in the ILP workload mode. As noted above, in the TLP mode, the SuperROB is turned off. However, in the ILP mode, the SuperROB is turned on in order to facilitate instruction management. Also, received instructions are received from at least two of the plurality of processors from a single input source. In other words, renaming based on a SuperROB uses a physical register file that is the same size as the architectural register file, together with a set of registers arranged as a queue data structure. This facilitates faster processing. Moreover, the cache may be accessed every alternate fetch cycle, thus providing even greater processing performance. The ICache is shared, and one of the cores (which one is a matter of convention) places requests for the two subsequent cache lines to fetch instructions from. "Next line A" is sent to the first core, and the 'next-next line B' is sent to the other core. The fetch logic for each of the two cores places their instructions in the SuperROB in the original program order. After that point in time, the available instructions in the SuperROB could be picked up and worked on by either of the two cores.

In FIG. 8, as instructions are issued, they are assigned entries for any results they may generate at the tail of the SuperROB. That is, a place is reserved in the queue. Logical order of instructions within this buffer is maintained so that if four instructions are issued, e.g., i to i+3 at once, i is put in the reorder buffer first, followed by i+1, i+2 and i+3. As instruction execution proceeds, the assigned entry is ultimately filled in by a value, representing the result of the instruction. When entries reach the head of the SuperROB, provided they have been filled in with their actual intended result, they are removed, and each value is written to its intended architectural register. If the value is not yet available, then it is required for the user to wait until the value does become available. Because instructions take variable times to execute, and because they may be executed out of program order, it may be found that the SuperROB entry at the head of the queue is still waiting to be filled, while later entries are ready. In this case, all entries behind the unfilled slot must stay in the SuperROB until the head instruction completes its operations.

Figure 9:
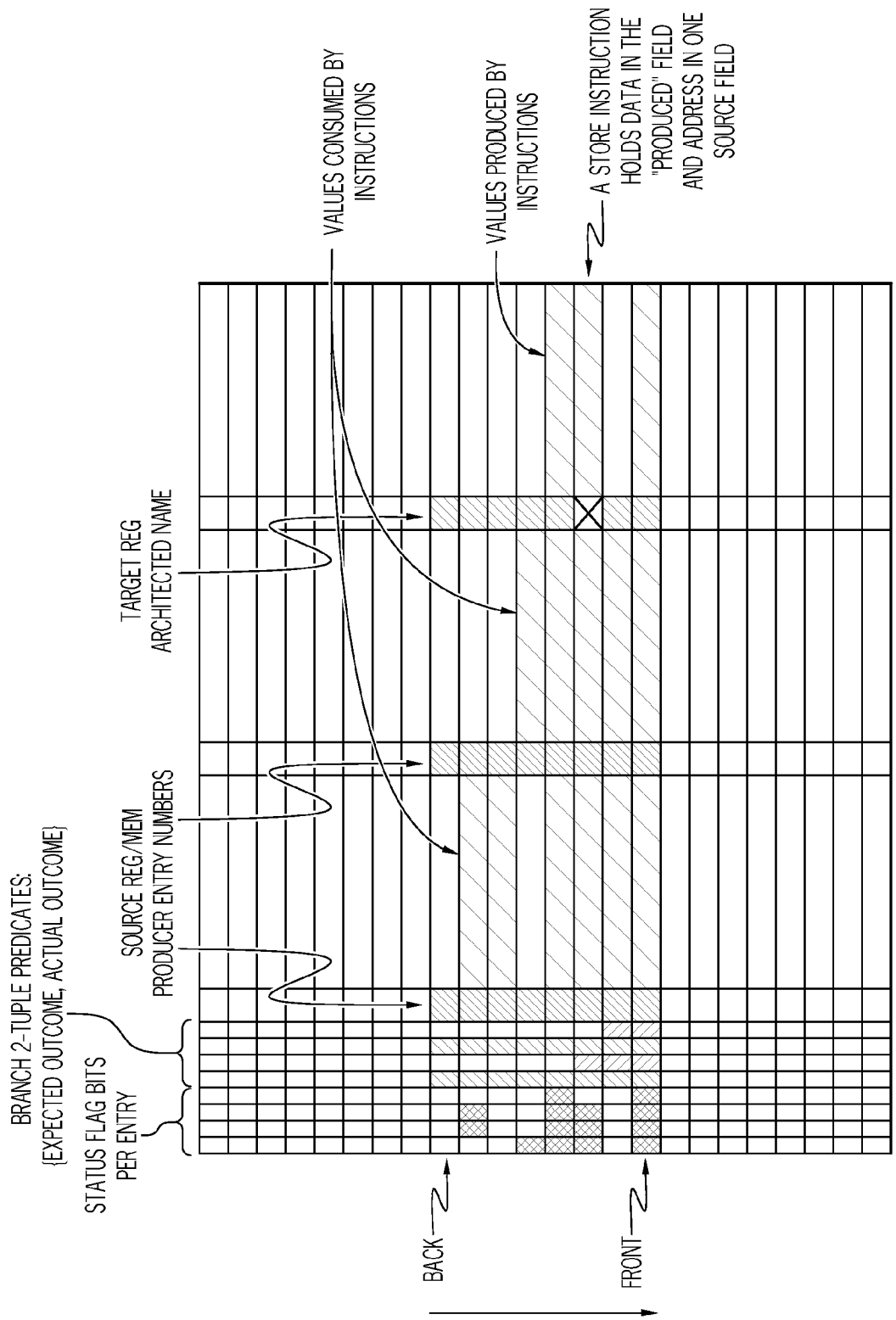
FIG. 9 illustrates one example of a SuperROB per entry diagram.

FIG. 9 shows the structure of each entry in the SuperROB. Each entry has a back or front pointer field, which is used by the ROB management hardware as a circular queue of ROB entries. That is followed by a set of status flags per entry, which indicate if the entry is being worked on by a core, or is available to be worked on. Next are two fields used exclusively to hold the prediction and the outcome of branch instructions. Next is a series of three fields, two for source register operands in the instruction, and one for the target register operand. Each source register field holds the id or number of the ROB entry that produced the value, which is useful in determining if the instruction is ready for execution. The target register field holds the architected register name into which the target register value must be committed when the instruction is retired. The value of the operand is also held along with each register field. For a store instruction which has no target register operand, the target register value is used to hold the datum to be stored in memory. More fields could be added on a per-instruction basis, and managed as needed.

Therefore, the processor, via the SuperROB, becomes a pure dataflow micro-architecture, where each entry in the SuperROB holds all the data pertaining to a single instruction in flight. The data contained may be source register values (as and when available), target register values (as values are produced), memory store values (for store instructions), and branch outcome values (predicates). The instructions are fetched in program order by using a protocol followed by two TLP front-ends, as illustrated in FIG. 9. One SuperROB entry is allocated for each decoded instruction. Also, each fetched instruction could be from separate ICaches, Trace Cache or other cache types. As further shown in FIG. 9, the decode logic of each pipeline operates independently of each other. Thus, both pipelines of cores A and B of FIG. 8 monitor the SuperROB, and pick up the work, and do the work when work is available. The results of the work are written back to the appropriate SuperROB entry.

Moreover, independently decoupled state machines operate in a purely dataflow fashion. In other words, a state machine decodes instructions to rename its source operands (to the temporally preceding SuperROB entry numbers, or fetch values from architected registers). The state machine also fetches values from SuperROB entries and updates the sources of the waiting instructions. The state machine also marks the instructions that are ready to be executed and dispatches instructions to the execution backend. The back-end logic updates the appropriate SuperROB entry upon completion. As a result, there are no separate bypasses between the two independent execution backends and all the communication between the two pipelines is carried out via the SuperROB.

In addition, the exemplary embodiments of the present application are not limited to the structures in FIGS. 1-9. In other words, more than two cores could be connected to 'morph' the processor. Also, it is possible to hold actual values in a separate future/history file (with or without a separate architected register file). The state machine may also fetch instructions every alternate cycle from the Icaches or from an Ifetch buffer. Therefore, there may be variations based on pre-decode information that is available from the ICaches. Also, a split of the SuperROB is possible. The split may be for a register data-flow and for a memory data-flow (separate load/store associative lookup queue). Furthermore, variations on the contents of SuperROB entries is allowed, variations based on the basic nature of the TLP core are allowed, and variations based on Simultaneous Multithreading Processor (SMT) or not-SMT is allowed.

Figure 10:
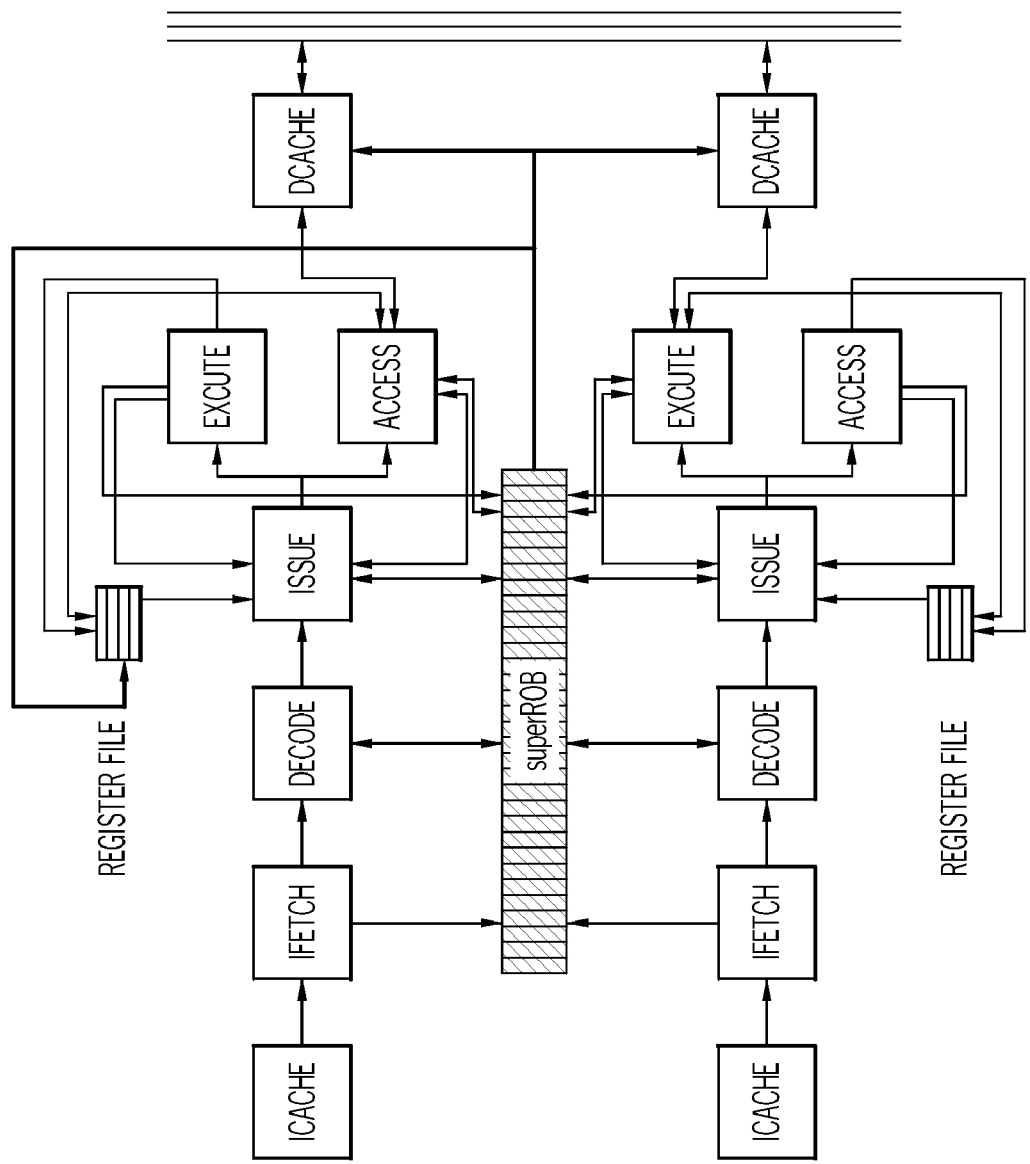
FIG. 10 illustrates one example of a manner in which two cores are connected to each other by a SuperROB structure.

Referring to FIG. 10, a manner in which two cores, individually designed for efficient execution of data-dependence chain code, are connected to each other by means of the SuperROB structure. The SuperROB is a queue of instructions, with each entry also holding other information about the instruction. The computer system operates in either TLP (thread-level parallel) mode, or ILP mode. When in TLP mode, it is understood that the programs to be executed on the system are data-dependence chains programs. When in ILP mode, the programs to be executed on the system are ILP programs. The SuperROB is disabled when the computer is in TLP mode, and it is enabled when the computer is in ILP mode. Change of mode could be carried out in a variety of ways, for example, under explicit control of the programmer, or under implicit control of the OS or the HyperVisor, or under pure hardware control with the processor having monitoring hardware that watches the amount of dependence nature of instructions temporally and switches the mode from TLP to ILP or vice-versa.

Figure 11:
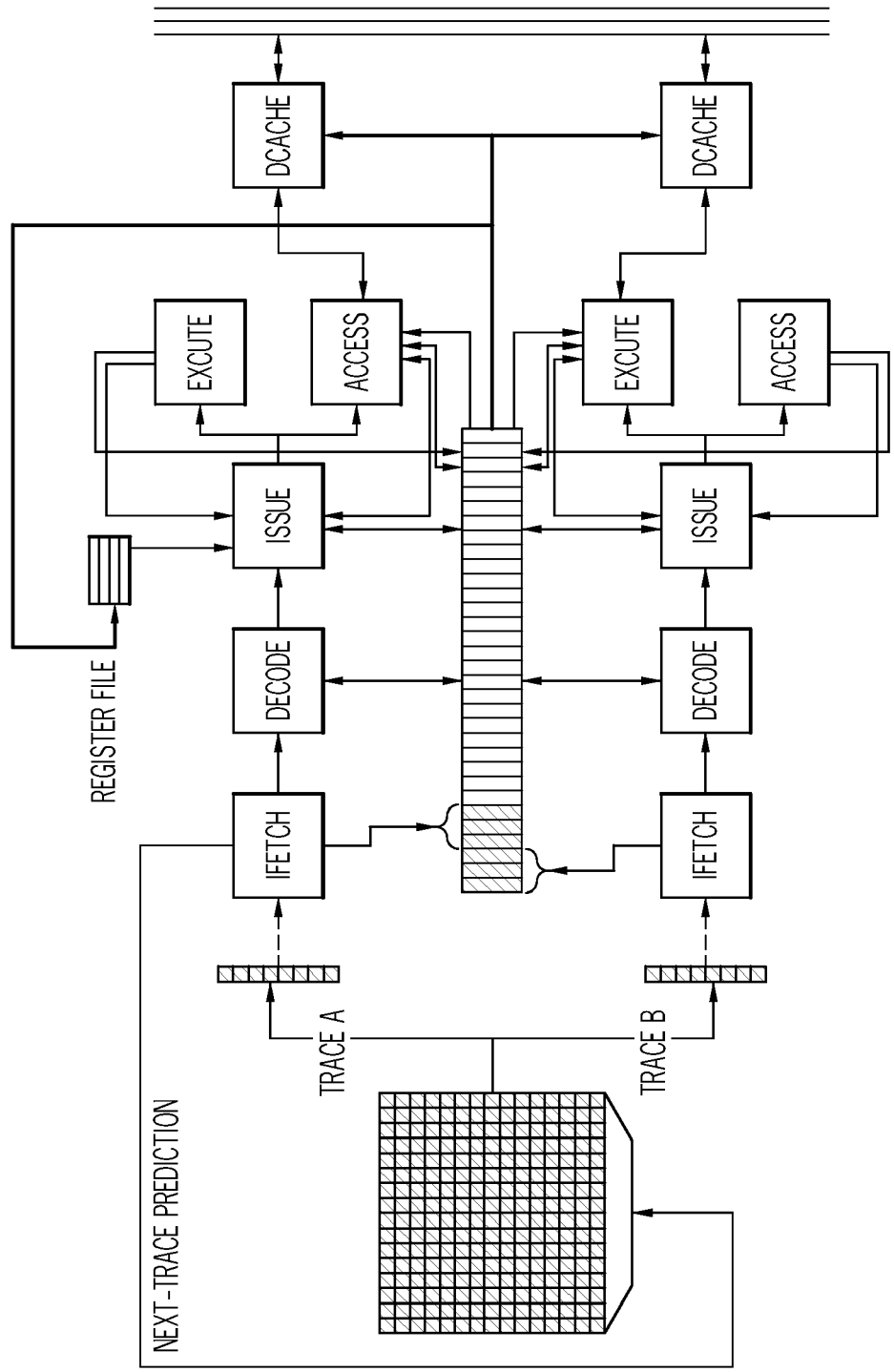
FIG. 11 illustrates one example of a SuperROB in ILP mode having an Ifetch working with a single trace cache line.

Referring to FIG. 11, in the ILP mode, the instruction fetch logic is shown working with a single trace cache line A (prediction for which is supplied by one of the two cores). The trace cache now holds a single ILP program (which is unified rather than shared as in the TLP mode). Parts of the trace line are placed in SuperROB by one core, and the remaining part is placed by the other core.

Figure 12:
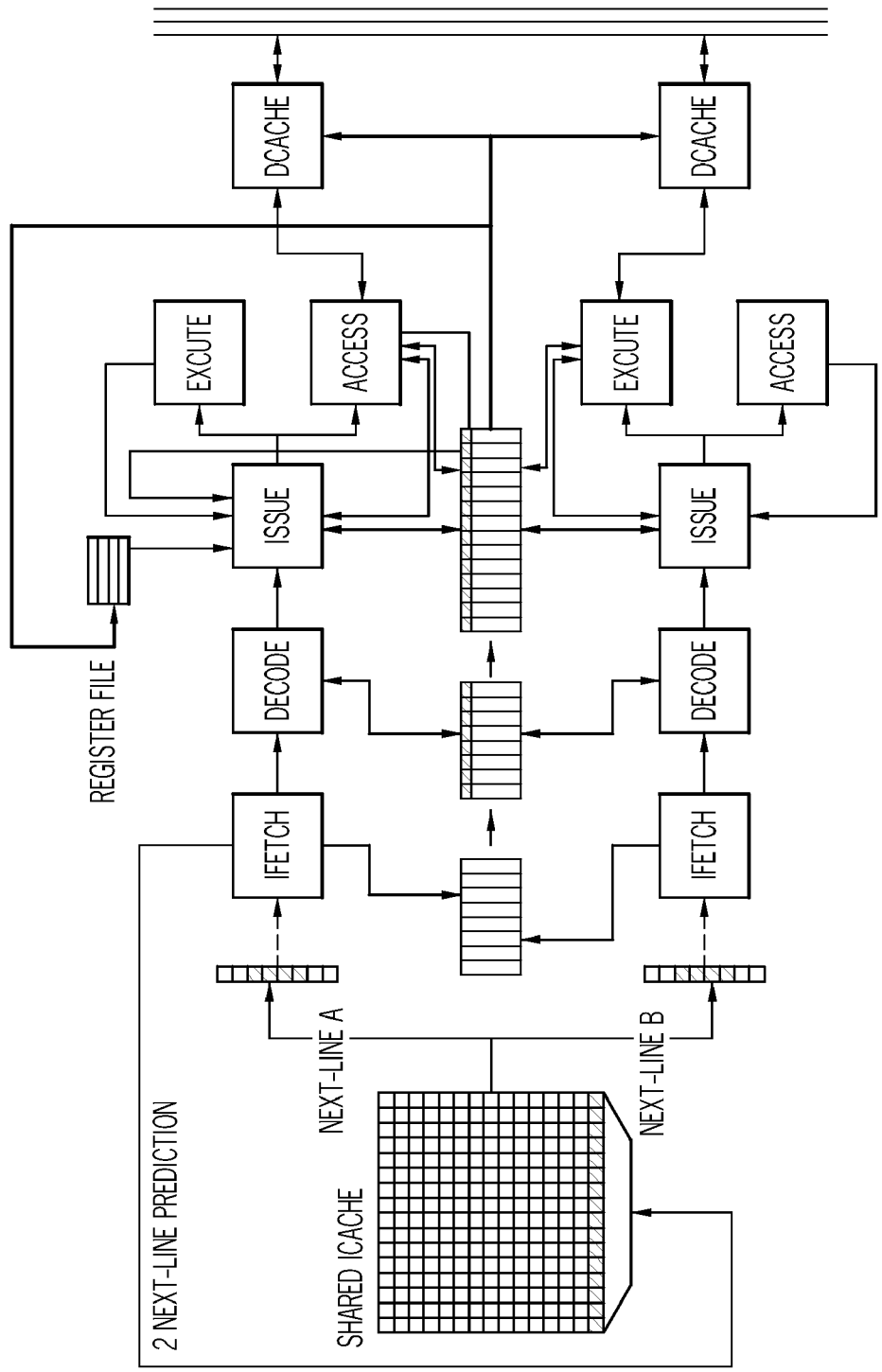
FIG. 12 illustrates one example of a SuperROB shown as a series of queues.

Referring to FIG. 12, the SuperROB is shown as a series of queues, the previous queue feeding the next, as a physical implementation of a logically single SuperROB structure. This could work with a regular ICache or a trace cache.

Moreover, instructions are placed in the SuperROB, in program order, by one or both the IFetch stages of logic connected to it. Once placed in the SuperROB, the Decode stages of logic from both the cores carry out the task of instruction decode, and update the status of instructions. The Issue logic stages from the two cores pick up decodes instructions, and issue them to their respective execution back-ends. One of the two register files is used to hold the architected state of the program, which one, is decided by convention. The other one is not used. When an instruction completes execution on either of the Execute logic stages or the Access logic stages, the instruction's status is updated in the SuperROB. This general manner of execution continues until the mode of the machine remains the ILP mode. It is to be generally understood that the ICache shown in the figure above holds a single program for execution when in ILP mode.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for operating a plurality of processors that each includes an execution pipeline for processing dependence chains, the method comprising:
    configuring the plurality of processors to execute the dependence chains on execution pipelines;
    implementing a Super Re-Order Buffer (SuperROB) in which received instructions are re-ordered for out-of-order execution when at least one of the plurality of processors is in an Instruction Level Parallelism (ILP) mode and at least one of the plurality of processors has a Thread Level Parallelism (TLP) core;
    detecting an imbalance in a dispatch of instructions of a first dependence chain compared to a dispatch of instructions of a second dependence chain with respect to dependence chain priority;
    determining a source of the imbalance; and
    activating the ILP mode when the source of the imbalance has been determined.

2. The method of claim 1, wherein the plurality of processors are configured for load-to-use, compute-to-compute, compute-to-compare, and load-to-compare-to-branch latencies.

3. The method of claim 1, wherein the plurality of processors are configured for high-throughput TLP-oriented applications.

4. The method of claim 1, wherein the plurality of processors are configured for ILP extraction on demand.

5. The method of claim 1, wherein each of the plurality of processors has a plurality of execution pipelines.

6. The method of claim 1, wherein the SuperROB operates across a plurality of TLP cores.

7. The method of claim 1, wherein the SuperROB allows for global communication.

8. The method of claim 1, wherein the SuperROB allows for ILP exposition, extraction, and exploitation.

9. The method of claim 1, wherein the SuperROB is deactivated whenever each of the plurality of processors are in TLP mode.

10. The method of claim 1, wherein entries in the SuperROB are in a non-architected state.

11. The method of claim 10, wherein the entries in the SuperROB are source register values, target register values, memory store values, and branch outcome values.

12. The method of claim 10, wherein each of the entries in the SuperROB is allocated for each decoded instruction.

13. The method of claim 1, wherein each of the received instructions are fetched from separate caches.

14. The method of claim 1, wherein each of the received instructions is fetched from an instruction cache or from a portion of a trace cache line or a normal cache line and is placed into the SuperROB by one of a plurality of instruction fetch logic elements of the plurality of processors.

15. The method of claim 1, wherein the execution pipelines of each of the plurality of processors monitors the SuperROB.

16. The method of claim 1, wherein the SuperROB is split into a first region for register data-flow and a second region for memory data-flow.

17. The method of claim 1, wherein the SuperROB is split into a first region for instruction fetch, a second region for instruction decode and dispatch, and a third region for instruction issue to execution units and instruction execution.

18. The method of claim 1, wherein the received instructions are received from at least two of the plurality of processors from a single input source.

* * * * *